US012604195B2

(12) United States Patent
Goh et al.

(10) Patent No.: US 12,604,195 B2
(45) Date of Patent: Apr. 14, 2026

(54) SYSTEM AND METHOD FOR DUAL LAYER AUDIO DEVICE PAIRING AUTHENTICATION WITH VOICE PATTERN RECOGNITION

(71) Applicant: Dell Products LP, Round Rock, TX (US)

(72) Inventors: Peng Lip Goh, Singapore (SG); Deeder M. Aurongzeb, Austin, TX (US); Eng Kang Chng, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 110 days.

(21) Appl. No.: 18/632,928

(22) Filed: Apr. 11, 2024

(65) Prior Publication Data

US 2025/0324262 A1 Oct. 16, 2025

(51) Int. Cl.
| *H04W 12/50* | (2021.01) |
| *G06F 21/32* | (2013.01) |
| *G06F 21/34* | (2013.01) |
| *G10L 17/04* | (2013.01) |
| *H03M 1/12* | (2006.01) |

(52) U.S. Cl.
CPC ............ *H04W 12/50* (2021.01); *G06F 21/32* (2013.01); *G06F 21/34* (2013.01); *G10L 17/04* (2013.01); *H03M 1/12* (2013.01)

(58) Field of Classification Search
CPC ........ H04W 12/50; G06F 21/32; G06F 21/34; G10L 17/04; H03M 1/12; H01Q 5/25; H04N 21/4856
See application file for complete search history.

(56) References Cited

U.S. PATENT DOCUMENTS

| 2006/0166718 A1 | 7/2006 | Seshadri | |
| 2009/0104940 A1 | 4/2009 | Seshadri | |
| 2016/0066184 A1 | 3/2016 | Bhargav-spantzel | |
| 2018/0376218 A1* | 12/2018 | Wu .................... | H04N 21/4183 |
| 2019/0098395 A1 | 3/2019 | Keeling | |
| 2020/0036709 A1 | 1/2020 | Mars | |
| 2020/0077246 A1 | 3/2020 | Mars | |
| 2020/0128395 A1 | 4/2020 | Mars | |
| 2020/0128396 A1 | 4/2020 | Mars | |

(Continued)

*Primary Examiner* — Vernal U Brown
(74) *Attorney, Agent, or Firm* — Prol Intellectual Property Law, PLLC; H. Kenneth Prol

(57) ABSTRACT

A dongle operatively coupled to an information handling system includes a dongle hardware microcontroller and a dongle radio to wirelessly couple the information handling system to wireless headphones, the wireless headphones including a microphone to receive audio voice input from the user via the wireless headphones. The dongle hardware microcontroller to receive the voice audio input from the wireless headset and execute computer-readable program code of a voice pattern recognition module to determine a recited pairing authentication code and compare the recited pairing authentication code to a generated pairing authentication code visually presented to the user on a video display device of the information handling system to determine and to compare a voice pattern from the voice audio input from the user with a user voice pattern profile of an authorized user stored in a voice pattern database to determine whether the user is an authorized user before commencing pairing.

20 Claims, 4 Drawing Sheets

(56)　　　　　References Cited

U.S. PATENT DOCUMENTS

| | | | |
|---|---|---|---|
| 2021/0279314 A1* | 9/2021 | Rodriguez Bravo | .. H04R 5/033 |
| 2023/0352835 A1* | 11/2023 | Pan | H01Q 5/25 |
| 2024/0012893 A1 | 1/2024 | Rodriguez Bravo | |

* cited by examiner

SYSTEM AND METHOD FOR DUAL LAYER AUDIO DEVICE PAIRING AUTHENTICATION WITH VOICE PATTERN RECOGNITION

FIELD OF THE DISCLOSURE

The present disclosure generally relates to pairing of an audio input peripheral device to an information handling system. More specifically, the present specification describes a method of pairing an audio input peripheral device such as a wireless headset or wireless earphones to an information handling system using audio voice input at a microphone of the audio input peripheral device.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more applications such as a gaming application. Further, the information handling system may be operatively coupled to an audio input device such as a wireless headset.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
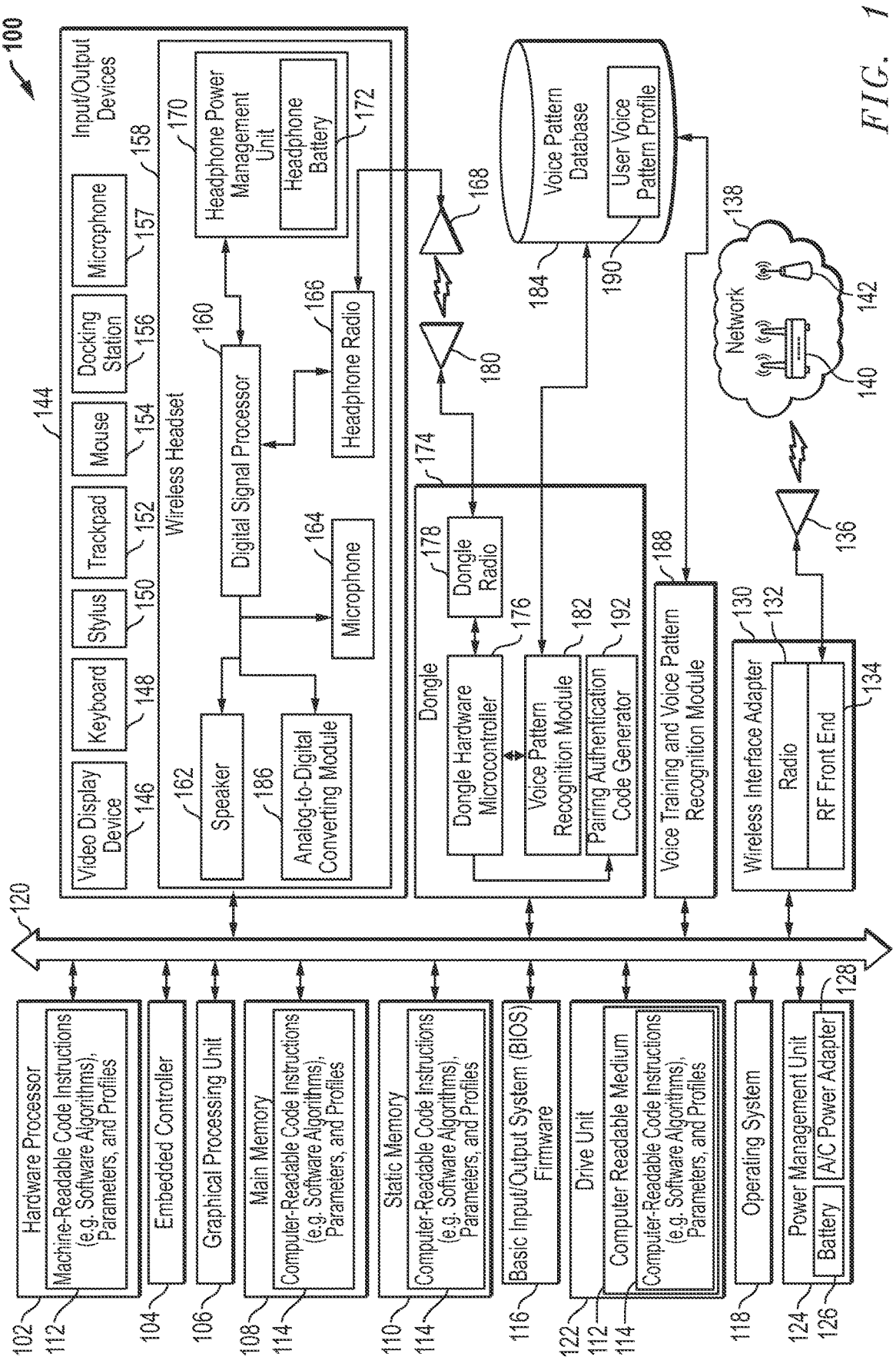
FIG. 1 is a block diagram illustrating an information handling system including wireless headphones operatively coupled to the information handling system via a dongle according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems may be operatively coupled to a plurality of input and output devices that allow a user to interact with the information handling system. The types of input may include cursor movement and selection input from a mouse and/or trackpad, keystroke input from a keyboard, and audio input into a microphone, and audio output at a speaker or other speaker driver. Often these peripheral devices may be wirelessly coupled to the information handling system via, for example, a Bluetooth® or Bluetooth Low Energy® (BLE) wireless connection. In order to complete this pairing, the peripheral devices may exchange pairing data that securely operatively couples the wireless peripheral device to the information handling system. However, these wireless data (e.g., audio data from a microphone on the peripheral device and pairing data) can be intercepted and hacked at the points when both the wireless peripheral device and the information handling system or dongle operatively coupled to the information handling system exchange encrypted key codes and handshakes. Indeed, a plurality of hacking processes such as bluebugging, blue snarfing, blue jacking, car whispering, location tracking, and blueborn attacks may be implemented by nefarious parties in order to obtain this data. These hacking tactics have proven to be significant issues when a user is trying to pair the peripheral device to the information handling system.

The present specification describes a dongle operatively coupled to an information handling system includes a dongle hardware microcontroller and a hardware connector to operatively couple the dongle to the information handling system to receive power from a power management unit (PMU) of the information handling system to power the hardware dongle microcontroller. The dongle further includes a dongle radio to wirelessly couple the information handling system to a wireless headphones such as a wireless headset or wireless earphones. The wireless headphones includes speakers for audio output and at least one microphone to receive audio voice input from the user via the wireless headset or wireless earphones. In an embodiment, the dongle hardware microcontroller receives the audio voice input from the wireless headphones and executes computer-readable program code of a voice pattern recognition module with a speech recognition portion to interpret or determine a recited pairing authentication code and compare it to a generated and displayed pairing authentication code presented to a user on a video display device of the information handling system. Further, the dongle hardware microcontroller receives the audio voice input from the wireless headphones and executes computer-readable program code of a voice pattern recognition module compare the audio voice input voice pattern to a user voice pattern profile stored on a voice pattern database and associated with an authorized user to determine whether the voice pattern is recognized as the authorized user's voice. This provides for the dual layer audio device pairing authentication system according to embodiments of the present disclosure. As described, in some embodiments a dongle is not used and execution of code instructions of the voice training and voice pattern recognition module may execute on the information handling system to execute the dual layer audio device pairing authentication system according to other embodiments of the present disclosure. The process of visually displaying the pairing authentication code via the video display device and having the user verbally repeat the pairing authentication code at, for example, a microphone of the wireless headset, earphone, or other audio input peripheral devices allows for the secure pairing of the wireless peripheral device to the information handling system using voice pattern recognition in a dual layer of security. This also prevents a hacker from being able to hack the signal due to the user's own voice acting as part of the unique security authentication data transmitted between the information handling system and wireless peripheral device via the dongle described herein.

In an embodiment, the dongle hardware microcontroller may execute computer-readable program code of an analog-to-digital converting module to convert an analog signal of the audio voice input from the operatively-coupled wireless headphone to a digital signal for the dongle hardware microcontroller to recognize recitation of the pairing authentication code and compare the audio voice input to the user voice pattern profile. In an embodiment and in order to reduce processing resource consumption at the information handling system, the dongle hardware microcontroller may execute the execute computer-readable program code of a voice pattern recognition module to interpret the pairing authentication code and to compare the audio voice input to a user voice pattern profile for an authorized user stored on a voice pattern database associated with the information handling system.

In an embodiment, the initiation of the wireless peripheral device may cause an initial request to pair the wireless headphones to the information handling system to be received at the dongle that sends an instruction to the information handling system to display the pairing authentication code. Because the dongle hardware microcontroller generates the pairing authentication code, the initiation of the wireless peripheral device and the receipt of the initial request to pair at the dongle may cause the dongle to generate this pairing authentication code and send that code to the information handling system with instructions to the information handling system to display the pairing authentication code on the video display device.

In an embodiment, the dongle hardware microcontroller may send instructions to the information handling system to display the pairing authentication code on the video display device for a threshold period of time. In an embodiment, when no audio voice input is received by the dongle hardware microcontroller within the threshold period of time, the dongle may generate a replacement pairing authentication code for the user to vocally repeat in order to pair the wireless headphones to the information handling system.

This replacement pairing authentication code may be different than the previously generated pairing authentication code such that the security of the code is maintained during the pairing process.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 140, a base station transceiver 142, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 108, (volatile (e.g., random-access memory, etc.), or static memory 110, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, or any combination thereof. Additional components of the information handling system 100 may include one or more storage devices such as static memory 110 or drive unit 122. The information handling system 100 may include or interface with one or more communications ports for communicating with external devices, as well as various input and output (I/O) devices 144, such as a docking station 156, a mouse 154, a trackpad 152, a stylus 150, a keyboard 148, a video/graphics display device 146, wireless headphones 158 such as wireless earphones, wireless headset, etc., or any combination thereof. Portions of an information handling system 100 may themselves be considered information handling systems 100. It is appreciated that the wireless headphones 158 described herein as a wireless headset is one of a specific type of headphone that includes wireless earbuds or wireless earphones, wireless headsets and the like that allow a user to be provided with audio output via a speaker and, in some example embodiments, provide audio input to a microphone of the headphones. Thus, although the present specification describes wireless headphones 158, it is appreciated various types of headphones described herein may also be used in connection with the systems and methods described herein. For ease of explanation, the headphones such as wireless headsets or wireless earphones described herein are referred to as a wireless headphones 158 in some embodiments.

Information handling system 100 may include devices or modules that embody one or more of the devices or execute instructions for one or more systems and modules. The information handling system 100 may execute instructions (e.g., software algorithms), parameters, and profiles 114 that may operate on servers or systems, remote data centers, or on-box in individual client information handling systems according to various embodiments herein. In some embodiments, it is understood any or all portions of instructions (e.g., software algorithms), parameters, and profiles 114 may operate on a plurality of information handling systems 100.

The information handling system 100 may include the hardware processor 102 such as a central processing unit (CPU). Any of the processing resources may operate to execute code that is either firmware or software code. Moreover, the information handling system 100 may include memory such as main memory 108, static memory 110, and disk drive unit 122 (volatile (e.g., random-access memory, etc.), nonvolatile memory (read-only memory, flash memory etc.) or any combination thereof or other memory with computer readable medium 112 storing instructions (e.g., software algorithms), parameters, and profiles 114 executable by the hardware processor 102, EC 104, GPU 106, or any other hardware processing device. The information handling system 100 may also include one or more buses 120 operable to transmit communications between the various hardware components such as any combination of various I/O devices 144 as well as between hardware processors 102, an EC 104, the operating system (OS) 118, the basic input/output system (BIOS) 116, the wireless interface adapter 130, or a radio module, among other components described herein. In an embodiment, the hardware processor 102, EC 104, and/or GPU 106 may execute one or more bus drivers in order to transmit this data between the information handling system 100 and the input/output devices 144 described herein. In an embodiment, the information handling system 100 may be in wired or wireless communication with the I/O devices 144 such as wireless headphones 158, a keyboard 148, a mouse 154, video display device 146, stylus 150, or trackpad 152 among other peripheral devices.

As described herein, the information handling system 100 further includes a video/graphics display device 146. The video/graphics display device 146 in an embodiment may function as a liquid crystal display (LCD), an organic light emitting diode (OLED), a flat panel display, or a solid-state display. It is appreciated that the video/graphics display device 146 may be wired or wireless and may be an external video/graphics display device 146 that allows a user to increase the desktop area by extending the desktop in an embodiment. Additionally, as described herein, the information handling system 100 may include or be operatively coupled to a cursor control device (e.g., a trackpad 152, or gesture or touch screen input), a stylus 150, and/or a keyboard 148, among others that allows the user to interface with the information handling system 100 via the video/graphics display device 146. Information handling system 100 may also be operatively coupled to a peripheral device 144 such as the wireless headphones 158 or other smart peripheral device having a hardware processing device such as a hardware processor, microcontroller, or other hardware processing resource and which may be further operatively coupled to one or more additional peripheral devices 144. Various drivers and hardware control device electronics may be operatively coupled to operate the I/O devices 144 according to the embodiments described herein. The present specification contemplates that the I/O devices 144 may be wired or wireless.

A network interface device of the information handling system 100 shown as wireless interface adapter 130 can provide connectivity among devices such as with Bluetooth® or to a network 138, e.g., a wide area network (WAN), a local area network (LAN), wireless local area network (WLAN), a wireless personal area network (WPAN), a wireless wide area network (WWAN), or other network. In embodiments described herein, the wireless interface device 130 with its radio 132, RF front end 134 and antenna 136 is used to communicate with the wireless peripheral devices via, for example, a Bluetooth® or Bluetooth® Low Energy (BLE) protocols. In an embodiment, the WAN, WWAN, LAN, and WLAN may each include an AP 140 or base station 142 used to operatively couple the information handling system 100 to a network 138. In a specific embodiment, the network 138 may include macro-cellular connections via one or more base stations 142 or a wireless AP 140 (e.g., Wi-Fi), or such as through licensed or unlicensed WWAN small cell base stations 142. Connectivity may be via wired or wireless connection. For example, wireless network wireless APs 140 or base stations 142 may be operatively connected to the information handling system 100. Wireless interface adapter 130 may include one or more radio frequency (RF) subsystems (e.g., radio 132) with transmitter/receiver circuitry, modem circuitry, one or more antenna radio frequency (RF) front end circuits 134, one or more wireless controller circuits, amplifiers, antennas 136 and other circuitry of the radio 132 such as one or more antenna ports used for wireless communications via multiple radio access technologies (RATs). The radio 132 may communicate with one or more wireless technology protocols.

In an embodiment, the wireless interface adapter 130 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 128 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. The wireless interface adapter 130 can represent an add-in card, wireless network interface module that is integrated with a main board of the information handling system 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes computer-readable code instructions, parameters, and profiles 114 or receives and executes instructions, parameters, and profiles 114 responsive to a propagated signal, so that a hardware device connected to a network 138 may communicate voice, video, or data over the network 138. Further, the instructions 114 may be transmitted or received over the network 138 via the network interface device or wireless interface adapter 130.

The information handling system 100 may include a set of instructions 114 that may be executed to cause the computer system to perform any one or more of the methods or computer-based functions disclosed herein. For example, instructions 114 may be executed by a hardware processor 102, GPU 106, EC 104 or any other hardware processing resource and may include software agents, or other aspects or components used to execute the methods and systems described herein. Various software modules comprising application instructions 114 may be coordinated by an OS 118, and/or via an application programming interface (API) include a unified device API described herein. An example OS 118 may include Windows®, Android®, and other OS types. Example APIs may include Win 32, Core Java API, or Android APIs.

In an embodiment, the information handling system 100 may include a disk drive unit 122. The disk drive unit 122 and may include machine-readable code instructions, parameters, and profiles 114 in which one or more sets of machine-readable code instructions, parameters, and profiles 114 such as firmware or software can be embedded to be executed by the hardware processor 102 or other hardware processing devices such as a GPU 106 or EC 104, or other microcontroller unit to perform the processes described herein. Similarly, main memory 108 and static memory 110 may also contain a computer-readable medium for storage of one or more sets of machine-readable code instructions, parameters, or profiles 114 described herein. The disk drive unit 122 or static memory 110 also contain space for data storage. Further, the machine-readable code instructions, parameters, and profiles 114 may embody one or more of the methods as described herein. In a particular embodiment, the machine-readable code instructions, parameters, and profiles

114 may reside completely, or at least partially, within the main memory 108, the static memory 110, and/or within the disk drive 122 during execution by the hardware processor 102, EC 104, or GPU 106 of information handling system 100.

Main memory 108 or other memory of the embodiments described herein may contain computer-readable medium (not shown), such as RAM in an example embodiment. An example of main memory 108 includes random access memory (RAM) such as static RAM (SRAM), dynamic RAM (DRAM), non-volatile RAM (NV-RAM), or the like, read only memory (ROM), another type of memory, or a combination thereof. Static memory 110 may contain computer-readable medium (not shown), such as NOR or NAND flash memory in some example embodiments. The applications and associated APIs, for example, may be stored in static memory 110 or on the disk drive unit 122 that may include access to a machine-readable code instructions, parameters, and profiles 114 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 124 (a.k.a. a power supply unit (PSU)). The PMU 124 may include a hardware controller and executable machine-readable code instructions to manage the power provided to the components of the information handling system 100 such as the hardware processor 102 and other hardware components described herein. The PMU 124 may control power to one or more components including the one or more drive units 122, the hardware processor 102 (e.g., CPU), the EC 104, the GPU 106, a video/graphic display device 146, or other wired I/O devices 144 such as the mouse 154, the stylus 150, the keyboard 148, the wireless headphones 158, the speaker 172, and the trackpad 152 and other components that may require power when a power button has been actuated by a user. In an embodiment, the PMU 124 may monitor power levels and be electrically coupled to the information handling system 100 to provide this power. The PMU 124 may be coupled to the bus 120 to provide or receive data or machine-readable code instructions. The PMU 124 may regulate power from a power source such as the battery 126 or AC power adapter 128. In an embodiment, the battery 126 may be charged via the AC power adapter 128 and provide power to the components of the information handling system 100, via wired connections as applicable, or when AC power from the AC power adapter 128 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

In an embodiment, the information handling system 100 may include computer-readable program code instructions of a voice training and voice pattern recognition module 188. The execution of the computer-readable program code instructions of the voice training and voice pattern recognition module 188 by the hardware processor 102 of the information handling system 100 causes the information handling system 100 to train and generate a user voice pattern profile 190 based on audio input received from an authorized user via, for example, a microphone 157 associated with the information handling system 100. In an embodiment, this user voice pattern profile 190 may be generated prior to the user attempting to pair the wireless headphones 158 to the information handling system 100 and can be used to pair any type of peripheral device to the information handling system 100 where those peripheral devices include a microphone such as the microphone 164 of the wireless headphones 158 described herein. Thus, the systems and methods described herein may be used to operatively pair any type of peripheral device to the information handling system 100 so long as that peripheral device includes the capability of capturing the user's voice via a microphone.

Execution of the computer-readable program code instructions of the voice training and voice pattern recognition module 188 generates the user voice pattern profile 190 that is associated with the user of the information handling system 100 and wireless headphones 158 when the user provides authentication and identification during forming of the user's voice pattern profile 190. In an embodiment, the voice training and voice pattern recognition module 188 may implement any type of neural network or artificial neural network that receives audio input from the user in order to generate the user voice pattern profile 190. In an embodiment, the execution of the voice training and voice pattern recognition module 188 by the hardware processor 102 may cause the hardware processor 102 to present a sample text on the video display device 146 for the user to read. This training process may include a plurality of sample texts that the user is to read in order to properly train the voice training and voice pattern recognition module 188 in order to create the user voice pattern profile 190. After generating the user voice pattern profile 190, the hardware processor 102 may store this user voice pattern profile 190 on a voice pattern database 184. In an embodiment, the voice pattern database 184 may be maintained on a data storage device on the information handling system 100. In another embodiment, the user voice pattern profile 190 is stored on a voice pattern database 184 that is remote from the information handling system 100 such as a voice pattern database 184 on a server accessible to the information handling system 100 via a network connection. Because the user voice pattern profile 190 may be used to operatively pair any other peripheral device including the wireless headphones 158 to the information handling system 100, the information handling system 100 may maintain or have access to the user voice pattern profile 190 when a pairing request is received at the information handling system 100 via the dongle 174 or other wireless connection. In an embodiment, a voice training and voice pattern recognition module 188 may also conduct the voice pattern recognition for an authorized user when that the task of recognizing the user's voice pattern is being conducted on the information handling system 100 rather than the dongle 174 completing this task.

As described herein, the information handling system 100 may be operatively coupled to any number of peripheral devices including the wireless headphones 158 in the example embodiments described herein. In the embodiment shown in FIG. 1, the wireless headphones 158 is operatively coupled to the information handling system 100 via the use of a dongle 174. In an embodiment, in order to facilitate the wireless coupling of the wireless headphones 158 to the information handling system 100, the wireless headphones 158 includes a headphone radio 166 and headphone antenna 168 that allows the wireless headphones 158 to wirelessly transmit data to and from the dongle 174 and/or information handling system 100. As described herein, the wireless communication may be based on Bluetooth® or BLE communication protocols. Similarly, the dongle 174 may include a dongle radio 178 and dongle antenna 180 used to operatively couple the wireless headphones 158 to the information handling system 100 via the dongle 174. In an embodiment, the dongle 174 may communicate with the wireless headphones 158 using Bluetooth® or BLE communication protocols. In some embodiments, the systems and methods described herein can be conducted on the information handling system 100 directly without the need of the dongle 174 via the wireless interface adapter 130. As such, the information handling system 100 may be used to wirelessly couple the wireless headphones 158 to the information handling system directly with the hardware processor 102 executing the computer-readable program code instructions of the voice training and voice pattern recognition module 188 and transception of audio data to and from the wireless headphones 158.

In an embodiment, the wireless headphones 158 may include at least one speaker 162 to provide audio output to a user. The speaker 162 may be formed, in an example embodiment, into earcups or earpieces that are placed over or into the user's ear in order to hear the audio output from the speaker 162. As described herein, wireless headphones 158 may be a wireless headset used with methods of the embodiments of the present disclosure or a pair of earphones/earbuds may be used to execute the methods described in embodiments of the present disclosure. In an example embodiment, the earphones/earbuds may include individual pieces that each fit into each of the user's ears such. As such, in addition to the earphones/earbuds being in wireless communication with the information handling system 100, each of the earphones/earbuds within the pair may communicate wirelessly with each other via, for example, a Bluetooth® or BLE communication protocol.

In an embodiment, the wireless headphones 158 also includes a microphone 164 that receives audio voice input from the user according to embodiments herein. In an embodiment, the receipt and transmission of this audio data presented to the user via the speakers 162 and received from the user at the microphone 164 may be coordinated by a digital signal processor (DSP) 160 or other hardware processing device within the wireless headphones 158. In an embodiment, the DSP 160 may be responsible for audio signal processing prior to the audio data being sent, wirelessly, to the dongle 174 and after audio data has been received from the dongle 174. This audio processing may include, for example, measuring, filtering, and/or compressing analog signals associated with the audio data. It is appreciated that that the DSP 160 may perform any audio processing of the audio data and the present specification contemplates these other audio processing procedures.

Still further, the wireless headphones 158 may include a headphone PMU 170 and headphone battery 172 used to power the DSP 160, the speaker 162, and the microphone 164 described herein. The headphone PMU 170 may include a hardware controller and executable machine-readable code instructions to manage the power provided to the components of the wireless headphones 158 such as the DSP 160 and other hardware components described herein. The headphone PMU 170 may control power to one or more components including the one or more speakers 162, the microphone 164, and other components that may require power when a power button on the wireless headphones 158 has been actuated by a user. In an embodiment, the headphone PMU 170 may monitor power levels and be electrically coupled to the headphone battery 172 to provide this power.

In an embodiment, the dongle 174 may include a dongle microcontroller 176. The dongle microcontroller 176 may provide processing resources that facilitates the transmission of data to and from the wireless headphones 158 as described herein. In an embodiment, the dongle 174 may include a hardware connector that operatively couples the dongle 174 to the information handling system 100 and the hardware processor 102 of the information handling system 100 via the bus 120. This allows the PMU 124 of the information handling system 100 to provide power to the dongle microcontroller 176 of the dongle 174 as well as allow communication between the dongle microcontroller 176 and the hardware processor 102 of the information handling system 100. In an embodiment, the hardware connector is a universal serial bus (USB) connector that is operatively coupled to the information handling system 100 via a USB port of the information handling system 100.

During operation, the wireless headphones 158 may be initiated by the user by, for example, activating a switch or inserting the USB hardware connector or other plug into a USB port or other port of the information handling system 100 or by motion sensing, touch sensing, or other trigger or switch of the wireless headphones 158. This initiation of the wireless headphones 158 causes the headphone PMU 170 to provide power to the DSP 160 of the wireless headphones 158 via the headphone battery 172. In order to pair the wireless headphones 158 to the information handling system 100, the DSP 160 may direct that an initial pairing request be sent to the dongle 174 via the headphone radio 166 and headphone antenna 168 or wireless interface adapter 130 depending on if a dongle 174 is used. This initial pairing request may include data packets of information that contain details about the features and capabilities of the wireless headphones 158 along with identification data such as a make, model, and type of wireless headphones 158.

In an embodiment, the dongle 174 or wireless interface adapter 130 receives the initial pairing request and notifies the information handling system 100 of the pairing request from the wireless headphones 158. This notification may be accompanied by instructions to display a pairing authentication code on the video display device 146 of the information handling system 100. In an embodiment, the pairing authentication code may be generated by execution of computer-readable program code instructions of a pairing authentication code generator 192 by the dongle microcontroller 176. The execution of the pairing authentication code generator 192 may cause the dongle 174 to generate any type of pairing authentication code including a numeric code, an alpha-numeric code, a user-readable sentence, or any other text data that a user may read from the video display device 164 when the hardware processor 102 of the information handling system 100 displays the text data during the pairing process described herein. Again, it is appreciated that the execution of the pairing authentication code generator 192 may be conducted by a hardware processor 102 of the information handling system 100 with the execution of pairing authentication code generator 192 causing the information handling system 100 to generate any type of pairing authentication code. This pairing authentication code may be presented on the video display device 146 by the hardware processor 102 of the information handling system 100. In an embodiment, the hardware processor 102 of the information handling system 100 may also include on-screen instructions that are presented along with the pairing authentication code on the video display device 164 instructing the user to recite the pairing authentication code while wearing the wireless headphones 158 and at the microphone 164 of the wireless headphones 158.

When the pairing authentication code is displayed on the video display device 146, the dongle 174 or wireless interface adapter 130 may wait for the wireless headphones 158 to relay the audio voice input received at the microphone 164 of the wireless headphones 158 to the dongle 174 or wireless interface adapter 130. In an embodiment, the dongle microcontroller 176 of the dongle 174 may set a threshold time period for the user to provide this audio voice input at the microphone 164 and the dongle 174 to receive this audio data from the wireless headphones 158. Again, where the information handling system 100 is used without the dongle 174, the hardware processor 102 may set the threshold time period for the user to provide this audio voice input at the microphone 157 as the information handling system 100 receives this audio data from the wireless headphones 158. In an embodiment, this threshold time period may be set to 30 seconds thereby allowing a user time to recite the pairing authentication code displayed on the video display device 146 of the information handling system 100. Where the threshold time period has expired without the dongle 174 or wireless interface adapter 130 receiving the audio voice input from the wireless headphones 158, the dongle microcontroller 176 or wireless interface adapter 130 may reset the pairing authentication code to be displayed on the video display device 164 of the information handling system 100 in order to maintain a level of security in the pairing authentication code used to confirm pairing of the wireless headphones 158 to the information handling system 100.

When the dongle microcontroller 176 of the dongle 174 or wireless interface adapter 130 receives the pairing authentication code (e.g., within the threshold time period) the audio voice input is interpreted, and the pairing authentication code is verified with the generated pairing authentication code. In an embodiment, a comparison of the audio voice input with the stored user voice pattern profile 190 for an authorized user may be made. In an embodiment, the DSP 160 of the wireless headphones 158 may execute computer-readable program code instructions of an analog-to-digital converting module 186 in order to convert the analog signals received at the microphone 164 of the wireless headphones 158 into a digital signal. This digital signal of the audio voice input may be transmitted from the wireless headphones 158 to the dongle 174 or wireless interface adapter 130 using the headphone radio 166 and headphone antenna 168 as described herein.

In one embodiment, the dongle microcontroller 176 may execute computer-readable program code instructions of a voice pattern recognition module 182 in order to compare the audio voice input (now in a digital form) to the user voice pattern profile 190 stored on the voice pattern database 184. With the dongle microcontroller 176 of the dongle 174 executing the computer-readable program code instructions of the voice pattern recognition module 182, the hardware processing resources of the information handling system 100 may not be consumed thereby reducing the dependency on the hardware processor 102 of the information handling system 100 to complete the processes described herein. In another embodiment, the hardware processor 102 of the information handling system 100 may execute the computer-readable program code instructions of the voice training and voice pattern recognition module 188 and in those embodiments where the dongle microcontroller 176 is not capable of executing these computer-readable program code instructions of the voice pattern recognition module 182. Thus, it is appreciated that any hardware processing device associated with or operatively coupled to the information handling system 100 may be used to execute the computer-readable program code instructions of the voice pattern recognition module 182 or voice training and voice pattern recognition module 188 to conduct embodiments herein.

Where the voice pattern of the audio voice input does not match the user voice pattern profile 190 for an authorized user, the information handling system 100 may prevent pairing with the wireless headphones 158. In an embodiment, where the voice pattern of the audio voice input does not match the user voice pattern profile 158 despite matching the recited pairing authentication code with the displayed pairing authentication code, the wireless headphones 158 is not paired with the information handling system 100. Additionally, where the voice pattern of the audio voice input does match the user voice pattern profile 158 but does not match the pairing authentication code, the wireless headphones 158 is not paired with the information handling system 100. Thus, the processes of authenticating the user voice pattern profile 190 with the audio voice input and the process of authenticating the audio voice input reciting a pairing authentication code with the displayed pairing authentication code is a dual layer audio device pairing authentication system. This dual layer audio device pairing authentication system may be conducted or executed as code instructions in any order or concurrently by the dongle hardware microcontroller 176, the hardware processor 102, or a combination of both the dongle hardware microcontroller 176 and the hardware processor 102. In an embodiment, the execution of the voice pattern recognition module 182 by the dongle hardware microcontroller 176, the execution of the voice training and voice pattern recognition module 188 may operate concurrently in some embodiments in order to both determine that the audio voice input recited pairing authentication code matches the displayed pairing authentication code and that the audio voice input matches the user voice pattern profile 190 stored for an authorized user in order to provide authorization to operatively wirelessly couple the wireless headphones 158 to the information handling system 100.

In some embodiments herein, where the execution of the computer-readable program code instructions of the voice pattern recognition module 182 results in a comparison of the audio voice input matching the user voice pattern profile 190 and the audio voice input recited pairing authentication code has been determined to match the generated and displayed pairing authentication code, the information handling system 100 may respond to the wireless headphones 158 with a final acknowledgment key or other pairing authentication data that operatively pairs the wireless headphones 158 to the information handling system 100. In an embodiment, this final acknowledgement key may include any exchange of a private key or other encrypted data that is known only to the wireless headphones 158 and information handling system 100. The transmission of the acknowledgement key results in the pairing of the wireless headphones 158 to the information handling system 100.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
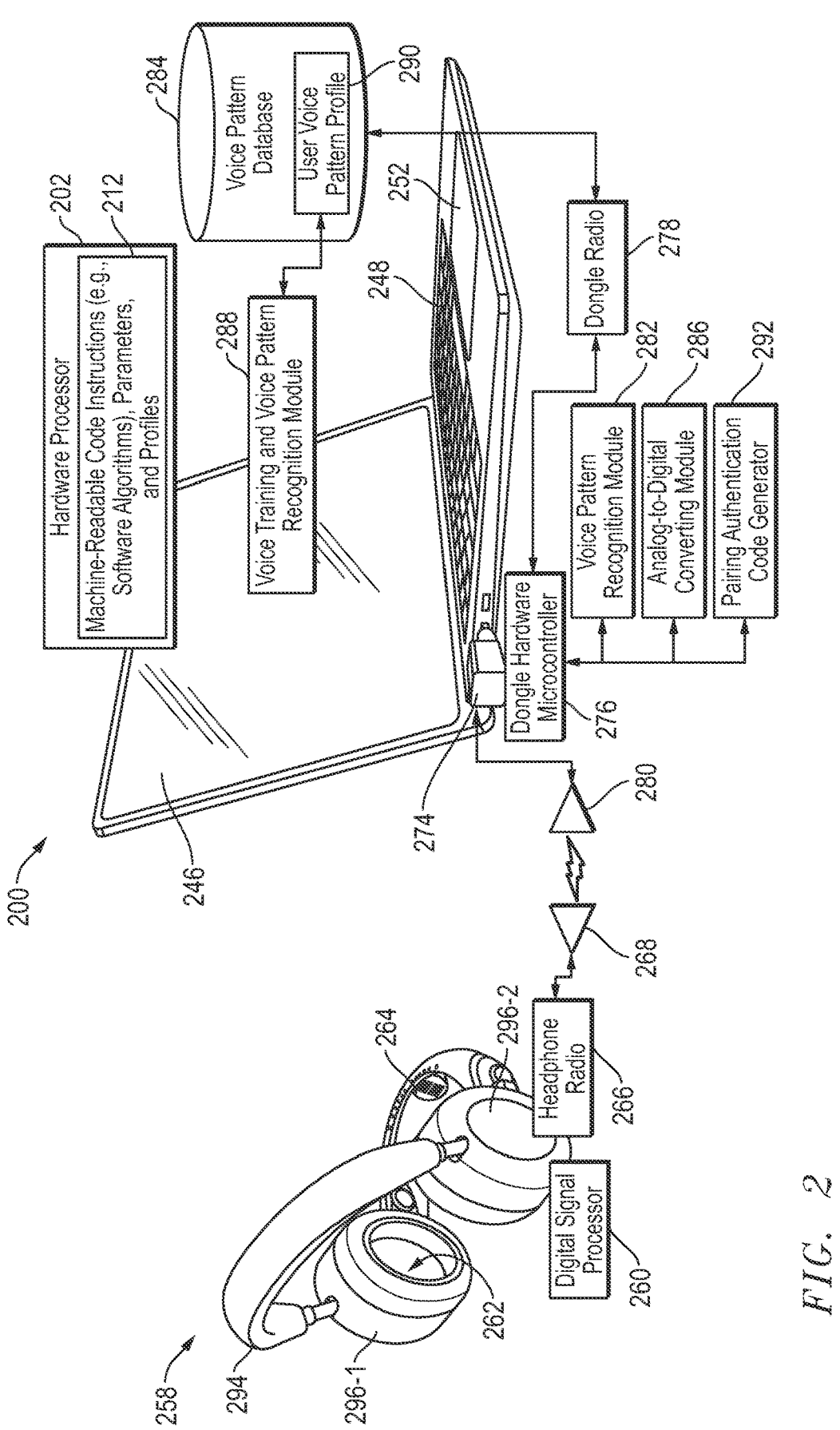
FIG. 2 is a graphic diagram depicting illustrating an information handling system and a wireless headset operatively coupled to the information handling system via a dongle according to another embodiment of the present disclosure.

FIG. 2 is a graphic diagram illustrating an information handling system 200 and a wireless headset 258 that may be wireless headphones (as in 158 of FIG. 1) operatively coupled to the information handling system 200 via a dongle 274 according to another embodiment of the present disclosure. FIG. 2 shows a wireless headset 258 that includes a headband 294 with two earcups 296-1, 296-2 arranged to cover or fit onto a user's ears during use. The wireless headset 258 in the example embodiment shown in FIG. 2 also includes a microphone boom that houses one or more microphones 264 in the boom. The microphone boom shown in FIG. 2 is arranged to be operatively coupled to each of the earcups 296-1, 296-2 such that the microphone boom covers the user's face such that as the user talks, the user's voice is prevented from being heard by others or, at least, limits the ability of other users to hear the user's voice as the user talks. In an embodiment, the earcups 296-1, 296-2 may each include a speaker 262 that provides audio output to a user.

As described herein, the information handling system 200 may include computer-readable program code instructions of a voice training and voice pattern recognition module 288. The execution of the computer-readable program code instructions of the voice training and voice pattern recognition module 288 by the hardware processor 202 of the information handling system 200 causes the information handling system 200 to train and generate a user voice pattern profile 290 based on audio input received from an authorized user via, for example, a microphone (not shown) associated with the information handling system 200. As described herein, the user voice pattern profile 290 is used to compare audio voice input received from the wireless headset 258 in order to recognize and confirm a recited pairing authentication code matches a generated pairing authentication code shown to and received by the user and used to pair the wireless headset 258 to the information handling system 200 via the dongle 274 as well as voice pattern recognition matching to determine that the voice data has a voice pattern that is the authorized user reading the pairing authentication code in embodiments herein.

In an embodiment, this user voice pattern profile 290 may be generated prior to the user attempting to pair the wireless headset 258 to the information handling system 200 and can be used to pair any type of peripheral device to the information handling system 200 where those peripheral devices include a microphone such as the microphone 264 of the wireless headset 258 described herein. Thus, the systems and methods described herein may be used to operatively pair any type of peripheral device to the information handling system 200 so long as that peripheral device includes the capability of capturing the user's voice via a microphone.

Execution of the computer-readable program code instructions of the voice training and voice pattern recognition module 288 is trained and generates the user voice pattern profile 290 that is associated with the user of the information handling system 200 and wireless headset 258 as an authorized user. In an embodiment, the voice training and voice pattern recognition module 288 may implement any type of neural network or artificial neural network that receives voice audio input from the user in order to determine voice pattern metrics unique to that user and generate the user voice pattern profile 290 to associate metrics in the detected voice audio input with identification of an authorized user. In an embodiment, the execution of the voice training and voice pattern recognition module 288 by the hardware processor 202 may cause the hardware processor 202 to present a sample text on the video display device 246 for the user to read. This training process may include a plurality of sample texts that the user is to read in order to properly train the voice training and voice pattern recognition module 288 in order to create the user voice pattern profile 290. This plurality of sample texts may include recitation of words, phrases, numbers or letters such that unique metrics of the digital representation of the user's voice in the audio voice input may be identified and the neural network may associate those unique metrics for particular words, phrases, numbers, or letters recited with the authorized user's identification for the user voice pattern profile 290 in embodiments herein. The sample texts may also include some or all of words, phrases, numbers, or letter or other utterances that may also comprise a portion or all of a pairing authentication code in some embodiments. Further authentication data for the user is gathered to identify the user as authenticated for the information handling system 200 and its peripheral devices. After generating the user voice pattern profile 290, the hardware processor 202 may store this user voice pattern profile 290 on a voice pattern database 284. In an embodiment, the voice pattern database 284 may be maintained on a data storage device on the information handling system 200. In another embodiment, the user voice pattern profile 290 is stored on a voice pattern database 284 that is remote from the information handling system 200 such as a voice pattern database 284 on a server accessible to the information handling system 200 via a network connection. Because the user voice pattern profile 290 may be used to operatively pair any other peripheral device including the wireless headset 258 to the information handling system 200, the information handling system 200 may maintain or have access to the user voice pattern profile 290 when a pairing request is received at the information handling system 200 via the dongle 274 or other wireless connection such as a wireless adapter of the information handling system 200.

As described herein, the information handling system 200 may be operatively coupled to any number of peripheral devices including the wireless headset 258 in the example embodiments described herein. In the embodiment shown in FIG. 2, the wireless headset 258 is operatively coupled to the information handling system 200 via the use of a dongle 274. In an embodiment, in order to facilitate the wireless coupling of the wireless headset 258 to the information handling system 200, the wireless headset 258 includes a headphone radio 266 and headphone antenna 268 that allows the wireless headset 258 to wirelessly transmit data to and from the dongle 274 and/or information handling system 200. As described herein, the wireless communication may be based on Bluetooth® or BLE communication protocols. Similarly, the dongle 274 may include a dongle radio 278 and dongle antenna 280 used to operatively couple the wireless headset 258 to the information handling system 200 via the dongle 274. In an embodiment, the dongle 274 may communicate with the wireless headset 258 using Bluetooth® or BLE communication protocols.

In an embodiment, the wireless headset 258 may include a speaker 262 to provide audio output to a user. The speaker 262 may be formed, in an example embodiment, into earcups or earpieces that are placed over or into the user's ear in order to hear the audio output from the speaker 262. In an embodiment, the wireless headset 258 also includes a microphone 264 that receives audio voice input from the user according to embodiments herein. In an embodiment, the receipt and transmission of this audio data presented to the user via the speakers 262 and received from the user at the microphone 264 may be coordinated by a digital signal processor (DSP) 260 or other hardware processing device within the wireless headset 258. In an embodiment, the DSP 260 may be responsible for audio signal processing prior to the audio data being sent, wirelessly, to the dongle 274 and after audio data has been received from the dongle 274. This audio processing may include, for example, measuring, filtering, and/or compressing analog signals associated with the audio data. It is appreciated that that the DSP 260 may perform any audio processing of the audio data and the present specification contemplates these other audio processing procedures.

Still further, the wireless headset 258 may include a headphone PMU 270 and headphone battery 272 used to power the DSP 260, the speaker 262, and the microphone 264 described herein. The headphone PMU 270 may include a hardware controller and executable machine-readable code instructions to manage the power provided to the components of the wireless headset 258 such as the DSP 260 and other hardware components described herein. The headphone PMU 270 may control power to one or more components including the one or more speakers 262, the microphone 264, and other components that may require power when a power button on the wireless headset 258 has been actuated by a user. In an embodiment, the headphone PMU 270 may monitor power levels and be electrically coupled to the headphone battery 272 to provide this power.

In an embodiment, the dongle 274 may include a dongle microcontroller 276. The dongle microcontroller 276 may provide processing resources that facilitates the transmission of data to and from the wireless headset 258 as described herein. In an embodiment, the dongle 274 may include a hardware connector that operatively couples the dongle 274 to the information handling system 200 and the hardware processor 202 of the information handling system 200 via the bus 220. This allows the PMU 224 of the information handling system 200 to provide power to the dongle microcontroller 276 of the dongle 274 as well as allow communication between the dongle microcontroller 276 and the hardware processor 202 of the information handling system 200. In an embodiment, the hardware connector is a universal serial bus (USB) connector that is operatively coupled to the information handling system 200 via a USB port of the information handling system 200.

During operation, the wireless headset 258 may be initiated by the user by, for example, activating a switch or inserting the USB hardware connector or other plug such as a dongle 274 into a USB port or other port of the information handling system 200 or by motion sensing, touch sensing, or other trigger or switch of the wireless headset 258. This initiation of the wireless headset 258 causes the headphone PMU 270 to provide power to the DSP 260 of the wireless headset 258 via the headphone battery 272. In order to pair the wireless headset 258 to the information handling system 200, the DSP 260 may direct that an initial pairing request be sent to the dongle 274 via the headphone radio 266 and headphone antenna 268 or information handling system 200 via a wireless adapter when no dongle 274 is used. This initial pairing request may include data packets of information that contain details about the features and capabilities of the wireless headset 258 along with identification data such as a make, model, and type of wireless headset 258.

In an embodiment, the dongle 274 or wireless interface adapter of the information handling system receives the initial pairing request and notifies the information handling system 200 of the pairing request from the wireless headset 258. This notification may be accompanied by instructions to display a pairing authentication code on the video display device 246 of the information handling system 200. In an embodiment, the pairing authentication code may be generated by execution of computer-readable program code instructions of a pairing authentication code generator 292 by the dongle microcontroller 276. The execution of the pairing authentication code generator 292 may cause the dongle 274 to generate any type of pairing authentication code including a numeric code, an alpha-numeric code, a user-readable sentence, or any other text data that a user may read from the video display device 264 when the hardware processor 202 of the information handling system 200 displays the text data during the pairing process described herein. Again, it is appreciated that the execution of the pairing authentication code generator 292 may be conducted by a hardware processor 202 of the information handling system 200 with the execution of the pairing authentication code generator 292 causing the information handling system 200 to generate any type of pairing authentication code in another embodiment where a dongle 274 is not used. This pairing authentication code may be presented on the video display device 246 by the hardware processor 202 of the information handling system 200. In an embodiment, the hardware processor 202 of the information handling system 200 may also include on-screen instructions that are presented along with the pairing authentication code on the video display device 264 instructing the user to recite the pairing authentication code while wearing the wireless headset 258 and at the microphone 264 of the wireless headset 258.

When the pairing authentication code is displayed on the video display device 246, the dongle 274 or wireless interface adapter of the information handling system may wait for the wireless headset 258 to relay the audio voice input received at the microphone 264 of the wireless headset 258 to the dongle 274 or wireless interface adapter of the information handling system. In an embodiment, the dongle microcontroller 276 of the dongle 274 may set a threshold time period for the user to provide this audio voice input at the microphone 264 and the dongle 274 to receive this audio data from the wireless headset 258. Again, where the information handling system 200 is used without the dongle 274, the hardware processor 202 may set the threshold time period for the user to provide this audio voice input at the microphone 257 as the information handling system 200 receives this audio data from the wireless headset 258. In an embodiment, this threshold time period may be set to 30 seconds thereby allowing a user time to recite the pairing authentication code displayed on the video display device 246 of the information handling system 200. Where the threshold time period has expired without the dongle 274 or wireless interface adapter of the information handling system receiving the audio voice input from the wireless headset 258, the dongle microcontroller 276 or wireless interface adapter of the information handling system may reset the pairing authentication code to be displayed on the video display device 264 of the information handling system 200 in order to maintain a level of security in the pairing authentication code used to confirm pairing of the wireless headset 258 to the information handling system 200.

When the dongle microcontroller 276 of the dongle 274 receives the recited pairing authentication code (e.g., within the threshold time period) as voice audio input, the audio voice input is interpreted to determine the recited pairing authentication code from the user, and the recited pairing authentication code is verified with the generated pairing authentication code displayed on the display device 246. In an embodiment, a comparison of the audio voice input is determined for a voice pattern profile, such as from words, number or letters recited as part of the recited pairing authentication code, and compared to the stored user voice pattern profile 290 of an authorized user for additional security. In an embodiment, the DSP 260 of the wireless headset 258 may execute computer-readable program code instructions of an analog-to-digital converting module 286 in order to convert the analog signals received at the microphone 264 of the wireless headset 258 into a digital signal of the voice audio input to determine the voice pattern profile that has been received with the recited pairing authentication code. This digital signal of the audio voice input may be transmitted from the wireless headset 258 to the dongle 274 using the headphone radio 266 and headphone antenna 268 as described herein.

In an embodiment, the dongle microcontroller 276 may execute computer-readable program code instructions of a voice pattern recognition module 282 in order to compare the audio voice input (now in a digital form) to the user voice pattern profile 290 stored on the voice pattern database 284 for an authorized user. With the dongle microcontroller 276 of the dongle 274 executing the computer-readable program code instructions of the voice pattern recognition module 282, the hardware processing resources of the information handling system 200 may not be consumed thereby reducing the dependency on the hardware processor 202 of the information handling system 200 to complete the processes described herein. In another embodiment, the hardware processor 202 of the information handling system 200 may execute the computer-readable program code instructions of the voice training and voice pattern recognition module 288 in those embodiments where the dongle microcontroller 276 is not capable of executing these computer-readable program code instructions of the voice pattern recognition module 282. Thus, it is appreciated that any hardware processing device associated with or operatively coupled to the information handling system 200 may be used to execute the computer-readable program code instructions of the voice pattern recognition module 282 or the voice training and voice pattern recognition module 288.

Where the voice pattern of the audio voice input does not match the user voice pattern profile 290 of an authorized user, the information handling system 200 may prevent pairing with the wireless headset 258. However, where the execution of the computer-readable program code instructions of the voice pattern recognition module 282 results in a match between the recited pairing authentication code and the displayed pairing authentication code as well as a comparison of the audio voice input that matches the user voice pattern profile 290 of an authorized user, the information handling system 200 may respond to the wireless headset 258 with a final acknowledgment key or other pairing authentication data that operatively pairs the wireless headset 258 to the information handling system 200. Thus, a dual layer audio device pairing authentication may be achieved by the system described in embodiments herein. In an embodiment, this final acknowledgement key may include any exchange of a private key or other encrypted data that is known only to the wireless headset 258 and information handling system 200. The transmission of the acknowledgement key results in the pairing of the wireless headset 258 to the information handling system 200.

Figure 3:
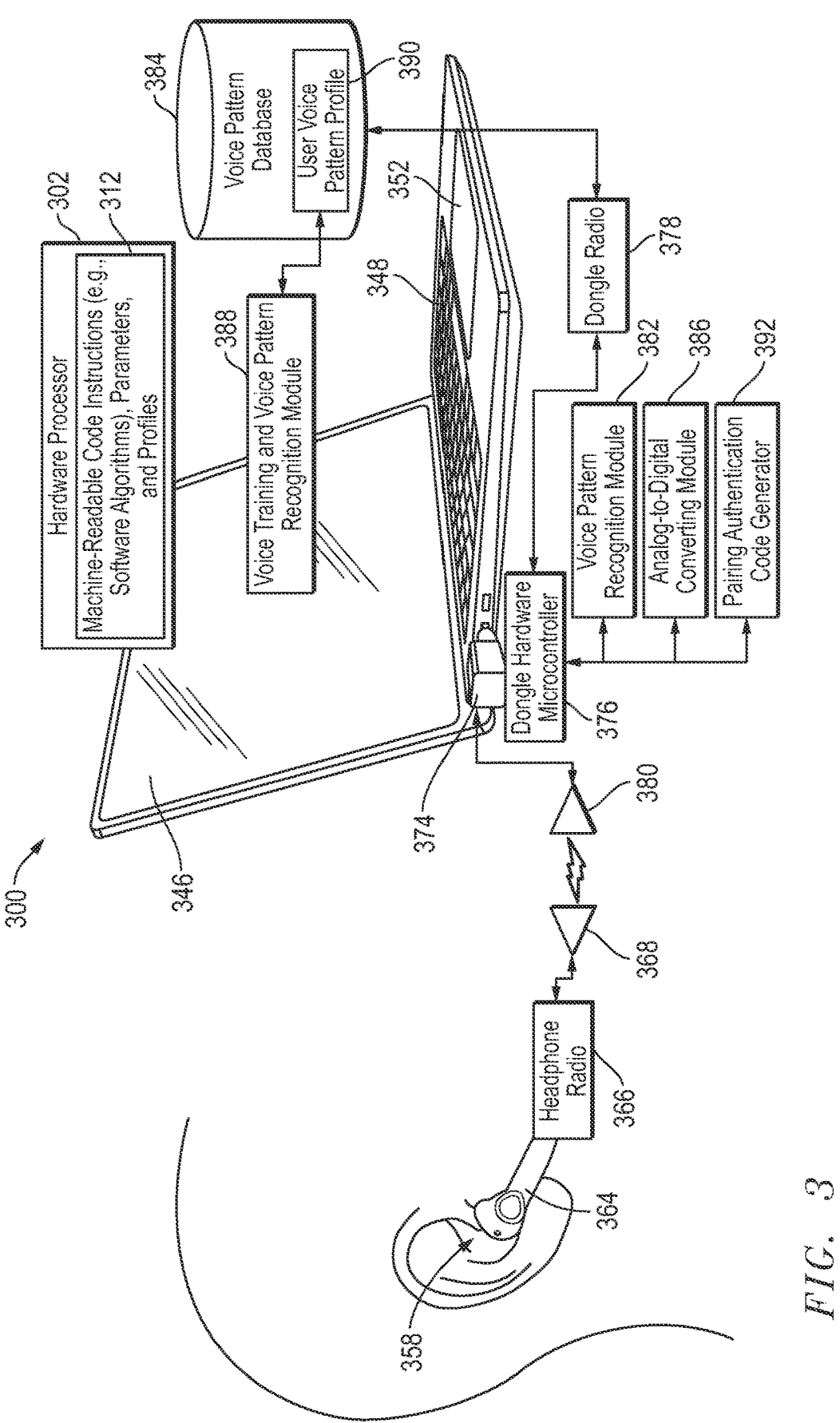
FIG. 3 is a graphic diagram depicting illustrating an information handling system and a wireless earphone, such as from a pair of earphones, operatively coupled to the information handling system via a dongle according to another embodiment of the present disclosure.

FIG. 3 is a graphic diagram depicting illustrating an information handling system 300 and a wireless earphones 358 such as an earbud of a pair that may be the headphones (e.g., 158 of FIG. 1) operatively coupled to the information handling system 300 via a dongle 374 according to another embodiment of the present disclosure. As described herein, the systems and methods described may be used to operatively couple any wireless peripheral device to the information handling system 300 when that wireless peripheral device includes a microphone 364 to receive audio voice input of a recited pairing authentication code in order to interpret and verify a match with the generated, displayed pairing authentication code and to compare the audio voice input and its voice pattern to a user voice pattern profile 290 generated by a trained voice training and voice pattern recognition module 288 and stored on a voice pattern database 284.

In an embodiment, the information handling system 300 may include computer-readable program code instructions of a voice training and voice pattern recognition module 388. The execution of the computer-readable program code instructions of the voice training and voice pattern recognition module 388 by the hardware processor 302 of the information handling system 300 causes the information handling system 300 to train and generate a user voice pattern profile 390 based on audio input received from the user via, for example, a microphone (not shown) associated with the information handling system 300. In an embodiment, this user voice pattern profile 390 may be generated prior to the user attempting to pair the wireless earphones 358 to the information handling system 300 and can be used to pair any type of peripheral device to the information handling system 300 where those peripheral devices include a microphone such as the microphone 364 of the wireless earphones 358 described herein. Thus, the systems and methods described herein may be used to operatively pair any type of peripheral device to the information handling system 300 so long as that peripheral device includes the capability of capturing the user's voice via a microphone.

Execution of the computer-readable program code instructions of the voice training and voice pattern recognition module 388 generates the user voice pattern profile 390 that is associated with an authorized user of the information handling system 300 and wireless earphones 358. In an embodiment, the voice training and voice pattern recognition module 388 may implement any type of neural network or artificial neural network that receives voice audio input from the user in order to generate the user voice pattern profile 390 and associate it with authentication data of an authorized user. In an embodiment, the execution of the voice training and voice pattern recognition module 388 by the hardware processor 302 may cause the hardware processor 302 to present a sample text on the video display device 346 for the user to read. This training process may include a plurality of sample texts that the user is to read in order to properly train the voice training and voice pattern recognition module 388 in order to create the user voice pattern profile 390. This plurality of sample texts may include recitation of words, phrases, numbers or letters such that unique metrics of the digital representation of the user's voice in the audio voice input may be identified and the neural network may associate those unique metrics for particular words, phrases, numbers, or letters recited with the authorized user's identification for the user voice pattern profile 390 in embodiments herein. The sample texts may also include some or all of words, phrases, numbers, or letter or other utterances that may also comprise a portion or all of a pairing authentication code in some embodiments. Further, the voice training and voice pattern recognition module 388 gathers identifying and authorization data from the authorized user that is training the user voice pattern profile 390. Authentication data for the user is gathered to identify the user as authenticated for the information handling system 300 and its peripheral devices. After generating the user voice pattern profile 390, the hardware processor 302 may store this user voice pattern profile 390 on a voice pattern database 384. In an embodiment, the voice pattern database 384 may be maintained on a data storage device on the information handling system 300. In another embodiment, the user voice pattern profile 390 is stored on a voice pattern database 384 that is remote from the information handling system 300 such as a voice pattern database 384 on a server accessible to the information handling system 300 via a network connection. Because the user voice pattern profile 390 may be used to operatively pair any other peripheral device including the wireless earphones 358 to the information handling system 300, the information handling system 300 may maintain or have access to the user voice pattern profile 390 when a pairing request is received at the information handling system 300 via the dongle 374 or other wireless connection such as a wireless interface adapter of the information handling system 300.

As described herein, the information handling system 300 may be operatively coupled to any number of peripheral devices including the wireless earphones 358 in the example embodiments described herein. In the embodiment shown in FIG. 3, the first wireless earphone 358 is shown in the figure and a second wireless earphone (not shown) worn in the opposite car of a pair is operatively coupled to the information handling system 300 via the use of a dongle 374. The wireless earphones 358 of a pair may be wirelessly coupled to each other via Bluetooth® or BLE or other WPAN as well as to information handling system 300. In an embodiment, in order to facilitate the wireless coupling of the wireless earphones 358 to the information handling system 300, the wireless earphones 358 includes a headphone radio 366 and headphone antenna 368 that allows the wireless earphones 358 to wirelessly transmit data to and from the dongle 374 and/or information handling system 300. As described herein, the wireless communication may be based on Bluetooth® or BLE communication protocols. Similarly, the dongle 374 may include a dongle radio 378 and dongle antenna 380 used to operatively couple the wireless earphones 358 to the information handling system 300 via the dongle 374. In an embodiment, the dongle 374 may communicate with the wireless earphones 358 using Bluetooth® or BLE communication protocols.

In an embodiment, the wireless earphones 358 may include a speaker 362 to provide audio output to a user. The speaker 362 may be formed, in an example embodiment, into the earpieces that are placed over or into the user's ear in order to hear the audio output from the speaker 362. In an embodiment, the wireless earphones 358 also includes a microphone 364 that receives audio voice input from the user according to embodiments herein. In an embodiment, the receipt and transmission of this audio data presented to the user via the speakers 362 and received from the user at the microphone 364 may be coordinated by a digital signal processor (DSP) 360 or other hardware processing device within the wireless earphones 358. In an embodiment, the DSP 360 may be responsible for audio signal processing prior to the audio data being sent, wirelessly, to the dongle 374 or information handling system 300 and after audio data has been received from the dongle 374 or the information handling system 300. This audio processing may include, for example, measuring, filtering, and/or compressing analog signals associated with the audio data. It is appreciated that the DSP 360 may perform any audio processing of the audio data and the present specification contemplates these other audio processing procedures.

Still further, the wireless earphones 358 may include a headphone PMU 370 and headphone battery 372 used to power the DSP 360, the speaker 362, and the microphone 364 described herein. The headphone PMU 370 may include a hardware controller and executable machine-readable code instructions to manage the power provided to the components of the wireless earphones 358 such as the DSP 360 and other hardware components described herein. The headphone PMU 370 may control power to one or more components including the one or more speakers 362, the microphone 364, and other components that may require power when a power button on the wireless earphones 358 has been actuated by a user. In an embodiment, the headphone PMU 370 may monitor power levels and be electrically coupled to the headphone battery 372 to provide this power.

In an embodiment, the dongle 374 may include a dongle microcontroller 376. The dongle microcontroller 376 may provide processing resources that facilitates the transmission of data to and from the wireless earphones 358 as described herein. In an embodiment, the dongle 374 may include a hardware connector that operatively couples the dongle 374 to the information handling system 300 and the hardware processor 302 of the information handling system 300 via the bus 320. This allows the PMU 324 of the information handling system 300 to provide power to the dongle microcontroller 376 of the dongle 374 as well as allow communication between the dongle microcontroller 376 and the hardware processor 302 of the information handling system 300. In an embodiment, the hardware connector is a universal serial bus (USB) connector that is operatively coupled to the information handling system 300 via a USB port of the information handling system 300.

During operation, the wireless earphones 358 may be initiated by the user by, for example, activating a switch or inserting the USB hardware connector or other plug of a dongle 374 into a USB port or other port of the information handling system 300 or by motion sensing, touch sensing, or other trigger or switch of the wireless earphones 358. This initiation of the wireless earphones 358 causes the headphone PMU 370 to provide power to the DSP 360 of the wireless earphones 358 via the headphone battery 372. In order to pair the wireless earphones 358 to the information handling system 300, the DSP 360 may direct that an initial pairing request be sent to the dongle 374 via the headphone radio 366 and headphone antenna 368 or directly to the information handling system 300 when no dongle 374 is present. This initial pairing request may include data packets of information that contain details about the features and capabilities of the wireless earphones 358 along with identification data such as a make, model, and type of wireless earphones 358.

In an embodiment, the dongle 374 receives the initial pairing request and notifies the information handling system 300 of the pairing request from the wireless earphones 358. This notification may be accompanied by instructions to display a pairing authentication code on the video display device 346 of the information handling system 300. In an embodiment, the pairing authentication code may be generated by execution of computer-readable program code instructions of a pairing authentication code generator 392 by the dongle microcontroller 376 or at the information handling system 300. The execution of the pairing authentication code generator 392 may cause the dongle 374 to generate any type of pairing authentication code including a numeric code, an alpha-numeric code, a user-readable sentence, or any other text data that a user may read from the video display device 364 when the hardware processor 302 of the information handling system 300 displays the text data during the pairing process described herein. In an embodiment, the hardware processor 302 of the information handling system 300 may also include on-screen instructions that are presented along with the pairing authentication code on the video display device 364 instructing the user to recite the pairing authentication code while wearing the wireless earphones 358 and the microphone 364 of the wireless earphones 358.

When the pairing authentication code is displayed on the video display device 346, the dongle 374 or information handling system 300 may wait for the wireless earphones 358 to relay the audio voice input received at the microphone 364 of the wireless earphones 358 to the dongle 374 or information handling system 300. In an embodiment, the dongle microcontroller 376 of the dongle 374 may set a threshold time period for the user to provide this audio voice input at the microphone 364 and the dongle 374 to receive this audio data from the wireless earphones 358. Again, where the information handling system 300 is used without the dongle 374, the hardware processor 302 may set the threshold time period for the user to provide this audio voice input at the microphone as the information handling system 300 receives this audio data from the wireless earphones 358. In an embodiment, this threshold time period may be set to 30 seconds thereby allowing a user time to recite the pairing authentication code displayed on the video display device 346 of the information handling system 300 however any threshold time period may be used. Where the threshold time period has expired without the dongle 374 or information handling system 300 receiving the audio voice input from the wireless earphones 358, the dongle microcontroller 376 may reset the pairing authentication code to be displayed on the video display device 364 of the information handling system 300 in order to maintain a level of security in the pairing authentication code used to confirm pairing of the wireless earphones 358 to the information handling system 300.

When the dongle microcontroller 376 of the dongle 374 or information handling system 300 receives the voice audio input for the user reciting the pairing authentication code (e.g., within the threshold time period), the audio voice input is interpreted, and the recited pairing authentication code is determined. This recited pairing authentication code is then verified with the generated, displayed pairing authentication code for a match. In an embodiment, a comparison of the audio voice input is made from the voice pattern received from reciting the pairing authentication code to the stored user voice pattern profile 390. In an embodiment, the DSP 360 of the wireless earphones 358 may execute computer-readable program code instructions of an analog-to-digital converting module 386 in order to convert the analog signals of the voice audio input received at the microphone 364 of the wireless earphones 358 into a digital signal for interpretation of the recited pairing authentication codes as well as for the voice pattern analysis. This digital signal of the audio voice input may be transmitted from the wireless earphones 358 to the dongle 374 or wireless interface adapter of an information handling system executing the voice pattern recognition module 382 or voice training and voice pattern recognition module 388 using the headphone radio 366 and headphone antenna 368 as described herein.

In an embodiment, the dongle microcontroller 376 may execute computer-readable program code instructions of a voice pattern recognition module 382 in order to compare the audio voice input (now in a digital form) to the user voice pattern profile 390 stored on the voice pattern database 384. With the dongle microcontroller 376 of the dongle 374 executing the computer-readable program code instructions of the voice pattern recognition module 382, the hardware processing resources of the information handling system 300 may not be consumed thereby reducing the dependency on the hardware processor 302 of the information handling system 300 to complete the processes described herein. In another embodiment, the hardware processor 302 of the information handling system 300 may execute the computer-readable program code instructions of the voice training and voice pattern recognition module 388 to conduct voice pattern recognition of an authorized user's voice pattern in those embodiments where the dongle microcontroller 376 is not capable of executing these computer-readable program code instructions of the voice pattern recognition module 382. Thus, it is appreciated that any hardware processing device associated with or operatively coupled to the information handling system 300 may be used to execute the computer-readable program code instructions of the voice pattern recognition module 382 or a trained voice training and voice pattern recognition module 388.

Where the voice pattern of the audio voice input does not match the user voice pattern profile 390 for an authorized user, the information handling system 300 may prevent pairing with the wireless earphones 358 despite a matched pairing authentication code. In an embodiment, where the voice pattern of the audio voice input that does not match the user voice pattern profile 358 but the recited pairing authentication code does match the displayed pairing authentication code, the wireless headset 358 is not paired with the information handling system 300. Also, where the voice pattern of the audio voice input that does match the user voice pattern profile 358 but the recited pairing authentication code does not match the displayed pairing authentication code, the wireless headphones 158 is not paired with the information handling system 300. Thus, the dual layer process of authenticating the user voice pattern profile 390 with the audio voice input as well as the process of authenticating the audio voice input with the pairing authentication code may be conducted in any order or concurrently by the dongle hardware microcontroller 376, the hardware processor 302, or a combination of both the dongle hardware microcontroller 376 and the hardware processor 302. In various embodiments, the execution of the voice pattern recognition module 382 by the dongle hardware microcontroller 376, the execution of the voice training and voice pattern recognition module 388, or some combination may operate concurrently in some embodiments in order to both determine that the audio voice input of a recited pairing authentication code matches the generated pairing authentication code and that the audio voice input voice pattern matches the user voice pattern profile 390 in order to provide authorization to operatively wirelessly couple the wireless earpieces 358 to the information handling system 300.

In some embodiments herein, where the execution of the computer-readable program code instructions of the voice pattern recognition module 382 or voice training and voice pattern recognition module 388 results in a comparison of the audio voice input matching the user voice pattern profile 390, the information handling system 300 may respond to the wireless earphones 358 with a final acknowledgment key or other pairing authentication data that operatively pairs the wireless earphones 358 to the information handling system 300. In an embodiment, this final acknowledgement key may include any exchange of a private key or other encrypted data that is known only to the wireless earphones 358 and information handling system 300. The transmission of the acknowledgement key results in the pairing of the wireless earphones 358 to the information handling system 300.

Figure 4:
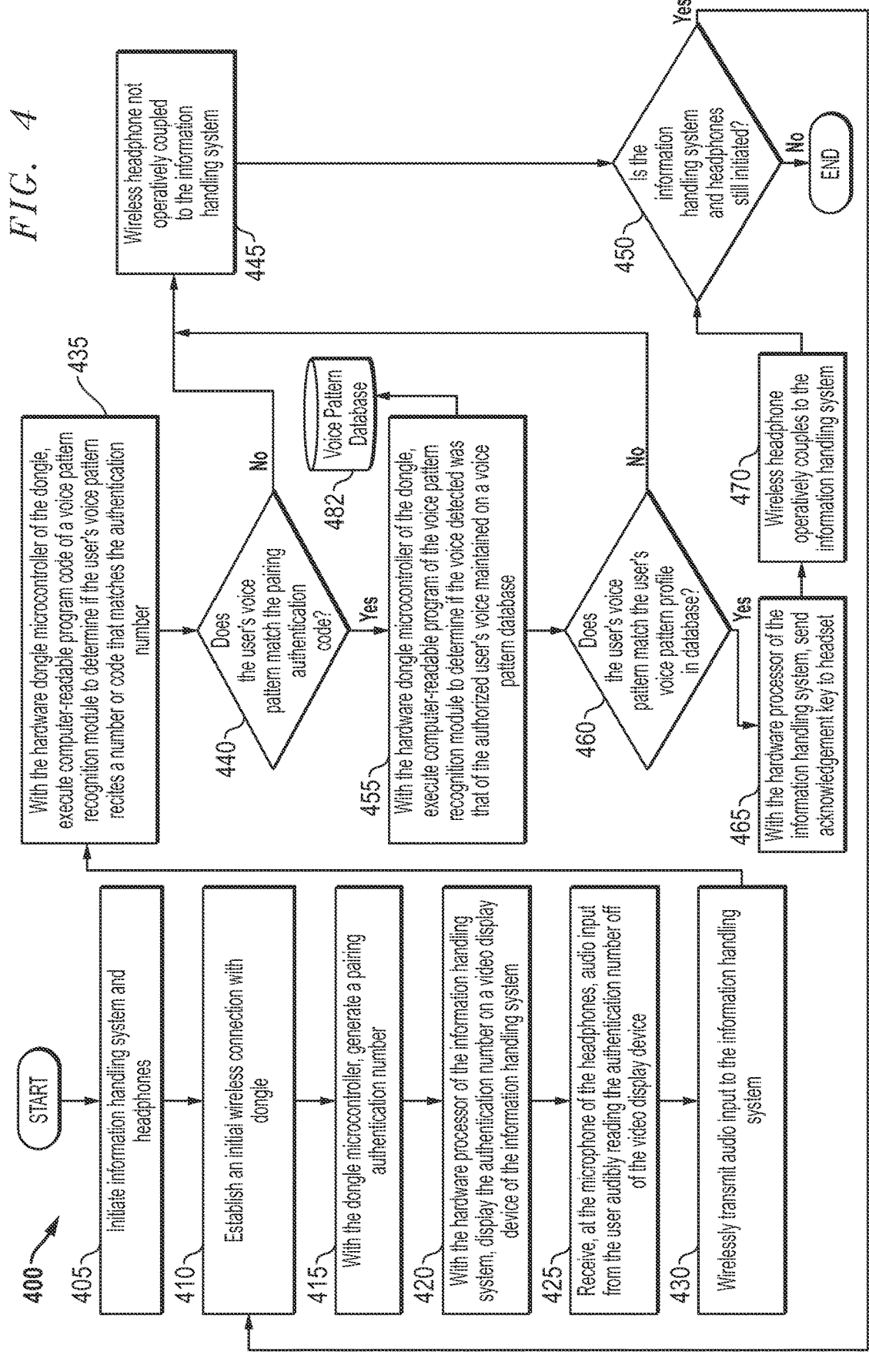
FIG. 4 is a flow chart showing a method of operatively coupling a wireless headset or earphones to an information handling system by implementing a dual-layer audio pairing authentication process using the user's voice according to an embodiment of the present disclosure.

FIG. 4 is a flow chart showing a method 400 of operatively coupling a wireless headphones, such as a headset or earphones, to an information handling system by implementing a dual-layer audio pairing authentication process using the user's voice according to another embodiment of the present disclosure. The method 400 as described herein may be used to operatively couple any wireless peripheral device that includes a microphone to capture the user's audio voice input.

At block 405, the method 400 includes initiating the information handling system and headphones. In an embodiment, the information handling system may be initiated via the user actuating a power button that causes a booting sequence to be initiated in order to execute a BIOS and OS at the hardware processor of the information handling system. In an embodiment, the initiation of the headphones may include, for example, actuating a switch, actuating a motion sensor or touch sensor, removing the headphones from a case, or other initiation trigger.

At block 410, in order to pair the wireless headphones to the information handling system, a DSP may direct that an initial pairing request be sent to the dongle or a wireless adapter of an information handling system if no dongle is used via the headphone radio and headphone antenna. This initial pairing request may include data packets of information that contain details about the features and capabilities of the wireless headphones along with identification data such as a make, model, and type of wireless headphones.

At block 415, the method 400 further includes generating a pairing authentication code at the dongle by the hardware dongle microcontroller executing computer-readable program code instructions of a pairing authentication code generator. In an embodiment, if the dongle is not used, the hardware processor of the information handling system may generate the pairing authentication code by executing computer-readable program code instructions of a pairing authentication code generator in an embodiment. The execution of the pairing authentication code generator may cause the hardware dongle microcontroller or a CPU to generate any type of pairing authentication code including a numeric code, an alpha-numeric code, a user-readable sentence, or any other text data that a user may read from the video display device.

At block 420, therefore, the hardware processor of the information handling system may be directed by the hardware dongle microcontroller or direct that the text data of the pairing authentication code be displayed during the pairing process described herein. In an embodiment, the hardware processor of the information handling system may also include on-screen instructions that are presented along with the pairing authentication code on the video display device instructing the user to recite the pairing authentication code while wearing the wireless headphones and at the microphone of the wireless headphones.

At block 425, the user may provide audio voice input at a microphone of the wireless headphones with the DSP receiving this audio voice input. In an embodiment, the DSP of the wireless headphones may execute computer-readable program code instructions of an analog-to-digital converting module in order to convert the analog signals received at the microphone of the wireless headphones into a digital signal. This digital signal of the audio voice input may be transmitted from the wireless headphones to the dongle or a wireless adapter of an information handling system if no dongle is used via the headphone radio and headphone antenna as described herein.

The method 400 may continue with, at block 430, the DSP of the wireless headphones wirelessly transmitting the audio voice input to the information handling system. Again, as described herein, the dongle may receive this input on behalf of the information handling system.

At block 435, the dongle microcontroller may execute computer-readable program code instructions of a voice pattern recognition module (e.g., voice pattern recognition module 176, FIG. 1 or voice training and voice pattern recognition module 188, FIG. 1) in order to compare the audio voice input (now in a digital form) including the recited pairing authentication code to the generated and displayed pairing authentication code from block 415 using speech recognition to determine the recited pairing authentication code and making the comparison to the generated pairing authentication code. The execution of the computer-readable program code of a voice pattern recognition module is used to determine if the user's voice pattern recites a number or code for the recited pairing authentication code that matches the generated pairing authentication code presented to the user on the video display device. In an embodiment, this process includes receiving the voice audio data from the wireless headphones as input data and recognize the words, letters, or numbers of the pairing authentication code spoken by the user (e.g., as presented in the voice audio data) and determine if that recited pairing authentication code matches the pairing authentication code text presented to the user. With the dongle microcontroller of the dongle executing the computer-readable program code instructions of the voice pattern recognition module, the hardware processing resources of the information handling system may not be consumed thereby reducing the dependency on the hardware processor of the information handling system to complete the processes described herein. In another embodiment, the hardware processor of the information handling system may execute the computer-readable program code instructions of the voice pattern recognition module in those embodiments where the dongle microcontroller is not capable of executing these computer-readable program code instructions of the voice pattern recognition module. Thus, it is appreciated that any hardware processing device associated with or operatively coupled to the information handling system may be used to execute the computer-readable program code instructions of the voice pattern recognition module. It is appreciated that, because the user voice pattern profile was previously generated by the hardware processor of the information handling system via execution of the computer-readable program code instructions of the voice training and voice pattern recognition module, this user voice pattern profile may be maintained on a data storage device of the information handling system for the dongle to access.

At block 440, the hardware dongle microcontroller of the dongle may determine whether the user's voice pattern or the audio voice input received from the wireless headphones was recognized as a recitation of the pairing authentication code and if the recited pairing authentication code matches the previously-generated pairing authentication code displayed on the display devices. Where the hardware dongle microcontroller determines that the audio voice input recited by the user does not match the displayed pairing authentication code at block 440, the method 400 includes, at block 445, the wireless headphones not being operatively coupled to the information handling system. At this point, the method 400 continues to block 450 with a determination as to whether the information handling system and wireless headphones are still initiated. Where the information handling system or headphones do not continue to be initiated, the method 400 may end here. Where the information handling system and headphone are still initiated, the method 400 may continue to block 410 in an attempt by the wireless headphone to again pair with the information handling system as described herein.

Where the hardware dongle microcontroller determines that the audio voice input includes a recited pairing authentication code that does match the generated pairing authentication code displayed to the user on a video display device of the information handling system at block 440, the method 400 proceeds to block 455. At block 455, the hardware dongle microcontroller of the dongle may execute computer-readable program of the voice pattern recognition module to determine if the voice detected was that of the user's voice based on a stored user voice pattern profile maintained on a voice pattern database. The hardware dongle microcontroller of the dongle may execute computer-readable program of the voice pattern recognition module to determine a voice pattern from the digital voice audio input of the recited pairing authentication code or other utterances from the user for one or more unique metrics that compare to the stored voice pattern profiles of one or more authorized users that were previously trained into the voice pattern database in an embodiment. This provides an additional layer of security for the wireless pairing process.

In another embodiment, the information handling system may implement a microphone (e.g., microphone 157, FIG. 1) and execute the computer-readable program code instructions of the voice training and voice pattern recognition module to train and generate this user voice pattern profile associated with the authorized user based on test phrases, words, number or letters recited by authorized users and associated with authorization data for those users. In an embodiment, this user voice pattern profile may be generated prior to the user attempting to pair the wireless headphone to the information handling system. The computer-readable program code instructions of the voice training and voice pattern recognition module may include, for example, a neural network machine learning module (e.g., an artificial neural network (ANN)) that trains the information handling system to train and generate the user voice pattern profile from identifying unique metrics in the user's voice patterns. In an embodiment, the computer-readable program code instructions of the voice training and voice pattern recognition module may be executed as a trained system using the trained neural network machine learning module to compare the user's voice audio input during a recited pairing authentication code to the user voice pattern profile in order to determine if the user is the authorized user allowed to conduct the pairing of the wireless headphones to the information handling system when a dongle is not used. The CPU of the information handling system may execute computer-readable program of the voice training and voice pattern recognition module to determine a voice pattern from the digital voice audio input of the recited pairing authentication code or other utterances from the user for one or more unique metrics that compare to the stored voice pattern profiles of one or more authorized users that were previously trained into the voice pattern database in an embodiment. This also provides an additional layer of security for the wireless pairing process in an embodiment.

At block 460, the hardware dongle microcontroller determines if the user's voice pattern matches the authorized user's user voice pattern profile in voice pattern database. Where the voice audio input provided by the user does not match the user voice pattern profile at the information handling system, the method 400 proceeds to block 445 to halt operations associated with wirelessly coupling the wireless headphones with the dongle or the information handling system as described herein. Flow may then proceed to block 450 as described in embodiments herein.

Where the voice audio input provided by the user does match the user voice pattern profile at the information handling system, the method 400 proceeds to block 465 with the hardware processor sending an acknowledgment key to the wireless headphones. In an embodiment, the information handling system may respond to the wireless headphones with a final acknowledgment key or other pairing authentication data that operatively pairs the wireless headphones to the information handling system. In an embodiment, this final acknowledgement key may include any exchange of a private key or other encrypted data that is known only to the wireless headphones and information handling system. The transmission of the acknowledgement key results in the pairing of the wireless headphones to the information handling system.

At block 470, the method 400 also includes wirelessly operatively coupling the wireless headphones to the information handling system. With the wireless headphones now wirelessly coupled to the information handling system, the method 400 may also include that determination as to whether the information handling system and wireless headphones is still initiated at block 450. Again, where the information handling system and wireless headphones are not still initiated, the method 400 may end here.

The blocks of the flow diagram of FIG. 4 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A dongle operatively coupled to an information handling system, comprising:

a dongle case housing a dongle hardware microcontroller and a dongle radio;

a hardware connector to operatively couple the dongle to the information handling system to receive power from a power management unit (PMU) of the information handling system to power the hardware dongle microcontroller;

the dongle radio to wirelessly couple the information handling system to wireless headphones, the wireless headphones including a microphone to receive audio voice input from the user via the wireless headphones;

the dongle hardware microcontroller to receive the audio voice input from the wireless headphones and execute computer-readable program code of a voice pattern recognition module to interpret the audio voice input for a recited pairing authentication code and compare the audio voice input to with a generated pairing authentication code visually presented to the user on a video display device of the information handling system to determine a match between the recited pairing authentication code and the generated pairing authentication code; and the dongle hardware microcontroller to receive the audio voice input from the wireless headphones and execute computer-readable program code of a voice pattern recognition module to determine a voice pattern from the audio voice input for comparison to a user voice pattern profile stored in a voice pattern database to determine whether the user is an authorized user before commencing pairing with the wireless headphones.

2. The dongle of claim 1 further comprising:

the dongle hardware microcontroller to execute computer-readable program code of an analog-to-digital converting module to convert an analog signal of the audio voice input from the wireless headphones to a digital signal for the dongle hardware microcontroller.

3. The dongle of claim 1 further comprising:

the dongle hardware microcontroller to receive an initial request to pair the wireless headphones to the information handling system to indicate to the information handling system to generate and display the generated pairing authentication code via the display device.

4. The dongle of claim 1 further comprising:

the dongle hardware microcontroller to relay a final pairing acknowledgement key to the wireless headphone when the dongle hardware microcontroller determines that the recited pairing authentication code by the user matches the generated authentication code presented to the user at the video display device and the voice pattern matches user voice pattern profile for the authorized user.

5. The dongle of claim 1 further wherein the user voice pattern profile is created via execution of computer-readable program code of a voice training and voice pattern recognition module comprising computer-readable program code of an artificial neural network (ANN) to determine unique voice pattern metrics from test phrases of audio input previously spoken by the authorized user to train the ANN in order to generate the user voice pattern profile associated with the authorized user.

6. The dongle of claim 1 wherein the wireless headphones are earphones.

7. A method of pairing wireless headphones to an information handling system, comprising:

receiving an initial request from the wireless headphones to operatively couple the wireless headphones to the information handling system;

generating a generated pairing authentication code with a hardware processor and transmitting an instruction to display the generated pairing authentication code to the user via a video display device of the information handling system;

receiving audio voice input from the wireless headphones via a radio and executing computer-readable program code via the hardware processor to determine a recited pairing authentication code from the audio voice input and determining if the recited authentication code matches the generated pairing authentication code visually presented to a user on the video display device; and executing computer-readable program code via the hardware processor to determine a voice pattern from the audio voice input for comparison to a user voice pattern profile stored in a voice pattern database to determine whether the user is an authorized user before commencing pairing with the wireless headphones.

8. The method of claim 7 further comprising:

executing the computer-readable program code via the hardware processor to determine the voice pattern from the audio voice input of the recited pairing authentication code for comparison to the user voice pattern profile stored in the voice pattern database to determine whether the user is the authorized user before commencing pairing with the wireless headphones.

9. The method of claim 7 further comprising:

relaying a final pairing acknowledgement key to the wireless headphones when the recited pairing authentication code by the authorized user matches the generated pairing authentication code presented to the user at the video display device and the authorized user is verified by matching the received voice pattern with the user voice pattern profile for the authorized user.

10. The method of claim 7 further comprising:

displaying instructions on the video display device to the user to read the generated pairing authentication code aloud while wearing the wireless headphones along with displaying the generated pairing authentication code.

11. The method of claim 7, wherein the hardware processor is a dongle microprocessor of a dongle operatively coupled to the information handling system via hardware port at the information handling system.

12. The method of claim 7, wherein the hardware processor is part of the information handling system.

13. The method of claim 7, wherein the wireless headphones are a wireless headset.

14. The method of claim 7 further comprising:

accessing the voice pattern database at an operatively coupled network server remote from the information handling system and accessible by the information handling system via a network connection by a wireless interface device.

15. The method of claim 7 further comprising:

displaying the pairing authentication code on the video display device for a threshold period of time and, when no audio voice input is received within the threshold period of time, generate a replacement generated pairing authentication code.

16. An information handling system comprising:

a hardware processor;

a memory device; and a power management unit (PMU) to provide power to the hardware processor and the memory device;

a dongle operatively coupled to the information handling system;

a dongle microcontroller of the dongle to generate a generated pairing authentication code when a request to pair is received from the wireless headphones;

a video display device to display, to a user, the generated pairing authentication code;

the dongle microcontroller to receive voice audio input from operatively-coupled wireless headphones via a dongle radio, the voice audio input including a user's voice; and the dongle microcontroller execute computer-readable code instructions determine if the user matches the generated pairing authentication code; and the dongle microcontroller to execute computer-readable code instructions of a voice pattern recognition module to determine a voice pattern from the voice audio input and compare the voice pattern of the user's voice with a trained neural network system to a user voice pattern profile of an authorized user stored in a voice pattern database to determine if the user is the authorized user before commencing pairing of the wireless headphones to the information handling system.

17. The information handling system of claim 16 further comprising:

the hardware processor to execute computer-readable program code of an analog-to-digital (A/D) converting module to convert an analog signal of the audio input from the operatively-coupled wireless headphone to a digital signal for the hardware processor to determine the voice pattern of the user's voice to compare to the user voice pattern profile having identified unique voice pattern metrics or the authorized user.

18. The information handling system of claim 16 further comprising:

the dongle microcontroller execute computer-readable code instructions for speech recognition to determine a recited pairing authentication code read by the user in the voice audio input and determine if the recited pairing authentication code matches the generated pairing authentication code.

19. The information handling system of claim 16 wherein the dongle microcontroller executes computer-readable code instructions of the voice pattern recognition module to determine the voice pattern from a recited pairing authentication code read by the user in the voice audio input.

20. The information handling system of claim 16, further comprising:

the dongle hardware microcontroller determines that either the audio voice input from the wireless headset does not match the generated pairing authentication code visually presented to the user on the video display device of the information handling system or that the voice pattern does not match the user voice pattern profile of the authorized user stored in the voice pattern database; and the dongle hardware microcontroller halts pairing the wireless headphone to the information handling system.

* * * * *